United States Patent
Woodfield et al.

(10) Patent No.: US 9,114,378 B2
(45) Date of Patent: Aug. 25, 2015

(54) IRON AND COBALT BASED FISCHER-TROPSCH PRE-CATALYSTS AND CATALYSTS

(71) Applicant: Brigham Young University, Provo, UT (US)

(72) Inventors: Brian F. Woodfield, Provo, UT (US); Calvin H. Bartholomew, Orem, UT (US); Kyle Brunner, Salt Lake Cuty, UT (US); William Hecker, Orem, UT (US); Xuchu Ma, Orem, UT (US); Fen Xu, Orem, UT (US); Lynn Astle, Provo, UT (US)

(73) Assignee: Brigham Young University, Provo, UT (US)

( * ) Notice: Subject to any disclaimer, the term of this patent is extended or adjusted under 35 U.S.C. 154(b) by 0 days.

(21) Appl. No.: 13/836,850

(22) Filed: Mar. 15, 2013

(65) Prior Publication Data

US 2013/0274093 A1 Oct. 17, 2013

Related U.S. Application Data

(60) Provisional application No. 61/615,681, filed on Mar. 26, 2012.

(51) Int. Cl.
*B01J 23/40* (2006.01)
*B01J 23/42* (2006.01)
(Continued)

(52) U.S. Cl.
CPC ............... *B01J 27/22* (2013.01); *B01J 23/745* (2013.01); *B01J 23/75* (2013.01); *B01J 23/78* (2013.01); *B01J 23/8913* (2013.01); *B01J 35/1014* (2013.01); *B01J 35/1019* (2013.01); *B01J 35/1038* (2013.01); *B01J 35/1061* (2013.01); *B01J 37/035* (2013.01); *B01J 37/08* (2013.01);
(Continued)

(58) Field of Classification Search
USPC .......... 502/326, 327, 330, 331, 338; 518/713, 518/715, 717, 719–721
See application file for complete search history.

(56) References Cited

U.S. PATENT DOCUMENTS 2,457,719 A * 12/1948 Pine et al. ...................... 502/331
2,767,202 A * 10/1956 Rottig ............................ 518/713
(Continued)

FOREIGN PATENT DOCUMENTS

AU 758256 3/2003
AU 2005203123 2/2006
(Continued)

OTHER PUBLICATIONS

U.S. Appl. No. 11/707,840, filed Feb. 16, 2007, Brian F. Woodfield et al.
(Continued)

*Primary Examiner* — Patricia L Hailey
(74) *Attorney, Agent, or Firm* — Workman Nydegger

(57) ABSTRACT

A method of making iron and cobalt pre-catalysts and catalysts in activated, finished form suitable for use in Fischer-Tropsch synthesis. The pre-catalysts are prepared by mixing an iron or cobalt salt, a base, and a metal oxide textural promoter or support. The reaction is carried out in a solvent deficient environment. The resulting product is then calcined at temperatures of about 300-500° C. to produce a metal oxide. The catalysts are prepared by reducing the metal oxide in the presence of hydrogen at temperatures of about 300-500° C. and carbiding the reduced metal in the case of iron.

21 Claims, 2 Drawing Sheets

Hydrocarbon Fractions

(51) Int. Cl.

| | | |
|---|---|---|
| B01J 23/58 | (2006.01) | |
| B01J 23/72 | (2006.01) | |
| B01J 23/74 | (2006.01) | |
| C07C 27/00 | (2006.01) | |
| B01J 27/22 | (2006.01) | |
| B01J 23/75 | (2006.01) | |
| B01J 37/03 | (2006.01) | |
| B01J 37/08 | (2006.01) | |
| B01J 23/745 | (2006.01) | |
| B01J 23/78 | (2006.01) | |
| B01J 23/89 | (2006.01) | |
| B01J 35/10 | (2006.01) | |
| C10G 2/00 | (2006.01) | |
| B01J 35/00 | (2006.01) | |

(52) U.S. Cl.
CPC ............... *B01J 37/082* (2013.01); *C10G 2/332* (2013.01); *B01J 35/006* (2013.01); *B01J 35/0013* (2013.01)

(56) References Cited

U.S. PATENT DOCUMENTS

| | | | | |
|---|---|---|---|---|
| 2,786,817 | A * | 3/1957 | Rottig | 502/174 |
| 3,260,679 | A * | 7/1966 | Wennerberg et al. | 502/174 |
| 3,271,324 | A * | 9/1966 | Hirschler, Jr. et al. | 502/331 |
| 3,900,387 | A | 8/1975 | Wilhelm | |
| 4,422,960 | A | 12/1983 | Shiroto et al. | |
| 4,543,341 | A | 9/1985 | Barringer et al. | |
| 4,622,308 | A * | 11/1986 | Koikeda et al. | 502/66 |
| 4,622,311 | A | 11/1986 | Wakui et al. | |
| 5,128,081 | A | 7/1992 | Siegel et al. | |
| 5,227,407 | A * | 7/1993 | Kim | 518/700 |
| 5,328,501 | A | 7/1994 | McCormick et al. | |
| 5,358,695 | A | 10/1994 | Helble et al. | |
| 5,397,758 | A | 3/1995 | Bouruetaubertot et al. | |
| 5,417,956 | A | 5/1995 | Moser | |
| 5,486,675 | A | 1/1996 | Taylor et al. | |
| 5,698,483 | A | 12/1997 | Ong et al. | |
| 5,927,621 | A | 7/1999 | Ziolo et al. | |
| 5,958,361 | A | 9/1999 | Laine et al. | |
| 6,027,706 | A | 2/2000 | Pinnavaia et al. | |
| 6,066,305 | A | 5/2000 | Dugger et al. | |
| 6,203,768 | B1 | 3/2001 | McCormick et al. | |
| 6,468,497 | B1 | 10/2002 | Khan et al. | |
| 6,503,475 | B1 | 1/2003 | McCormick et al. | |
| 6,506,493 | B1 | 1/2003 | Kumar et al. | |
| 6,558,847 | B1 | 5/2003 | Kawakami et al. | |
| 6,558,884 | B1 | 5/2003 | Greener et al. | |
| 6,600,127 | B1 | 7/2003 | Peterson et al. | |
| 6,620,351 | B2 | 9/2003 | Gupta et al. | |
| 6,660,897 | B1 | 12/2003 | Marchal-George et al. | |
| 6,749,648 | B1 | 6/2004 | Kumar et al. | |
| 6,749,966 | B2 | 6/2004 | Reitz et al. | |
| 6,777,639 | B2 | 8/2004 | Schroder et al. | |
| 6,803,027 | B1 | 10/2004 | Virkar et al. | |
| 6,962,946 | B2 | 11/2005 | Brady et al. | |
| 7,049,347 | B2 | 5/2006 | Hu | |
| 7,060,473 | B2 | 6/2006 | Phelps et al. | |
| 7,066,977 | B2 | 6/2006 | Huang | |
| 7,071,239 | B2 | 7/2006 | Ortego, Jr. et al. | |
| 7,081,267 | B2 | 7/2006 | Yadav | |
| 7,087,100 | B2 | 8/2006 | Lewis et al. | |
| 7,105,145 | B2 | 9/2006 | Seol et al. | |
| 7,118,727 | B2 | 10/2006 | Williams | |
| 7,125,536 | B2 | 10/2006 | Fu et al. | |
| 7,163,963 | B2 * | 1/2007 | Fraenkel | 518/715 |
| 7,259,286 | B2 * | 8/2007 | Jothimurugesan et al. | 585/638 |
| 7,452,844 | B2 | 11/2008 | Hu et al. | |
| 8,211,388 | B2 | 7/2012 | Woodfield et al. | |
| 8,216,963 | B2 * | 7/2012 | Kibby et al. | 502/260 |
| 8,226,740 | B2 | 7/2012 | Chaumonnot et al. | |
| 8,324,128 | B2 | 12/2012 | Rytter et al. | |
| 2002/0028745 | A1 * | 3/2002 | Krylova et al. | 502/326 |
| 2002/0110517 | A1 | 8/2002 | James et al. | |
| 2002/0187889 | A1 | 12/2002 | Lauf et al. | |
| 2003/0019328 | A1 | 1/2003 | Dunmead et al. | |
| 2003/0032192 | A1 | 2/2003 | Haubold et al. | |
| 2003/0051580 | A1 | 3/2003 | Lewis et al. | |
| 2003/0102099 | A1 | 6/2003 | Yadav et al. | |
| 2003/0124043 | A1 | 7/2003 | Yadav et al. | |
| 2003/0126948 | A1 | 7/2003 | Yadav et al. | |
| 2003/0138368 | A1 | 7/2003 | Yadav et al. | |
| 2003/0180213 | A1 | 9/2003 | Carnes et al. | |
| 2004/0005485 | A1 | 1/2004 | Yadav et al. | |
| 2004/0009118 | A1 | 1/2004 | Phillips et al. | |
| 2004/0086452 | A1 | 5/2004 | Seol et al. | |
| 2004/0108220 | A1 | 6/2004 | Stephan et al. | |
| 2004/0120884 | A1 | 6/2004 | Sherman | |
| 2004/0122115 | A1 * | 6/2004 | Espinoza et al. | 518/721 |
| 2004/0178530 | A1 | 9/2004 | Yadav | |
| 2004/0231464 | A1 | 11/2004 | Kurihara et al. | |
| 2005/0031517 | A1 | 2/2005 | Chan | |
| 2005/0053538 | A1 | 3/2005 | Holloway et al. | |
| 2005/0063889 | A9 | 3/2005 | Yadav et al. | |
| 2005/0063898 | A1 | 3/2005 | Ja Chisholm | |
| 2005/0119398 | A1 | 6/2005 | Zhang | |
| 2005/0191492 | A1 | 9/2005 | Yadav | |
| 2005/0214916 | A1 | 9/2005 | Absar et al. | |
| 2005/0228202 | A1 | 10/2005 | Nappa et al. | |
| 2005/0260122 | A1 | 11/2005 | Li et al. | |
| 2005/0271566 | A1 | 12/2005 | Yadav | |
| 2006/0084278 | A1 | 4/2006 | Winter et al. | |
| 2006/0110314 | A1 | 5/2006 | Torardi | |
| 2006/0115411 | A1 | 6/2006 | Jensen et al. | |
| 2008/0032132 | A1 | 2/2008 | Woodfield et al. | |
| 2009/0023581 | A1 | 1/2009 | DiMonte et al. | |
| 2009/0036558 | A1 | 2/2009 | Font Freide et al. | |
| 2010/0174002 | A1 * | 7/2010 | Kibby et al. | 518/715 |
| 2012/0122671 | A1 | 5/2012 | Polli et al. | |
| 2013/0184360 | A1 | 7/2013 | Eri et al. | |

FOREIGN PATENT DOCUMENTS

| | | |
|---|---|---|
| CN | 1184703 | 6/1998 |
| CN | 1477059 | 2/2004 |
| CN | 1478724 | 3/2004 |
| CN | 1660530 | 8/2005 |
| CN | 1986409 | 6/2007 |
| CN | 101384511 | 3/2009 |
| DE | 10163399 | 7/2003 |
| DE | 102004016131 | 10/2005 |
| EP | 0735001 | 10/1996 |
| EP | 1894626 | 3/2008 |
| JP | 2003-034526 | 2/2003 |
| JP | 2003-267704 | 9/2003 |
| JP | 2005-263615 | 9/2005 |
| JP | 2005-336019 | 12/2005 |
| JP | 2006-16236 | 1/2006 |
| JP | 2009-527365 | 7/2009 |
| WO | WO 00/24676 | 5/2000 |
| WO | WO 02/055240 | 7/2002 |
| WO | WO 02/060623 | 8/2002 |
| WO | WO 03/014011 | 2/2003 |
| WO | WO 03/031323 | 4/2003 |
| WO | WO 03/076338 | 9/2003 |
| WO | WO 2004/007357 | 1/2004 |
| WO | WO 20041092069 | 10/2004 |
| WO | WO 2005/026045 | 3/2005 |
| WO | WO 2005/060610 | 7/2005 |
| WO | WO 2005/077505 | 8/2005 |
| WO | WO 2005/080271 | 9/2005 |
| WO | WO 2005/118465 | 12/2005 |
| WO | WO 2006/000049 | 1/2006 |
| WO | 2006/070203 | 7/2006 |
| WO | WO 2007/098111 | 8/2007 |
| WO | 2009/0610707 | 5/2009 |

OTHER PUBLICATIONS

U.S. Appl. No. 13/069,317, filed Mar. 22, 2011, Calvin H. Bartholomew et al.

(56) References Cited

OTHER PUBLICATIONS

U.S. Appl. No. 13/836,985, filed Mar. 15, 2013, Brian F. Woodfield et al.

Lin, Y. et al., "Preparation of Nanometers Zinc Oxide Powders by Plasma Pyrolysis Technology and Their Applications", J. Am. Cream. Soc., vol. 83(11), pp. 2869-2871, (2000).

Sun, Ya-Ping et al., Preparation of Nickel, Cobalt, and Iron Nanoparticles Through the Rapid Expansion of Supercritical Fluid Solutions, (RESS) and Chemical Reduction, Chemistry of Materials, Jan. 1999, pp. 7-9, vol. 11, No. 1, American Chemical Society, Washington, US.

Liu, Yan-Li et al, Simple synthesis of $MgFe_2O_4$ nanoparticles and gas sensing materials, Sensors and Actuators B, Jun. 29, 2005, pp. 600-604, vol. 107, No. 2, Elsevier.

PCT Application No. PCT/US2007/004279, International Search Report and the Written Opinion of the International Searching Authority, Mailed Sep. 11, 2007.

International National Search Report for PCT/US2011/029472 dated Nov. 28, 2011.

Wang, J. et al., Synthesis and characterization of ZnO nanoparticles assembled in one-dimensional order, Inorganic Chemistry Communications, vol. 6 877-881 (2003).

Li, Z., et al., Non-isothermal kinetics studies on the thermal decomposition of zinc hydroxide carbonate, Thermochimica Acta, vol. 438, 102-106 (2005).

Lin, et al. "Characterisation of ZnO-based Varistors Prepared from Nanometre Precursor Powders", Advanced Materials for Optics and Electronics, Adv. Mater. Opt. Electron. 9, pp. 205-209 (1999).

Matson, D. Wet al., Ultrafine Iron Oxide Powders generated using a flow-through hydrothermal process, Mater. Lett. 1992, pp. 222-226, vol. 14, No. 4.

Kang, Y.C. et al, Preparation of Nanometre size oxide particles using filter expansion aerosol generator, Journal of Materials Science, 1996, pp. 2409-2416, vol. 31, No. 9.

Choy, H. et al., Citrate Route to the Piezoelectroic $Pb(Zr,Ti)O_3$ Oxide, J. Mater Chem., 1997, pp. 1815-1820. vol. 7, No. 9.

Reverchon, E. et al, Supercritical antisolvent precipitation of nanoparticles of superconductor precursors, Industrial & Engineering Chemistry Research, 1998, pp. 952-958, vol. 37, No. 3.

Meulenkamp, E. A., Synthesis and growth of ZnO nanoparticles, Journal of Physical Chemistry B, Jul. 16, 1998, pp. 5566-5572. Volume 102, No. 29, ACS, USA.

Chicheng, MA et al, A New Combined Process for Production of Fine Alumina Powders, Engineering chemistry and metallurgy, vol. 20, No. 4, 1999. (English Abstract).

Mizukoshi, Y. et al., Preparation of platinum nanoparticles by sonochemical reduction of the Pt(II) Ion, Langmuir, pp. 2733-2737, Apr. 13, 1999, vol. 15, No. 8, American Chem. Soc., US.

Camargo, E. R. et al., Pyrochlore-free $Pb(Mg_{1/3}Nb_{2/3})O_3$ prepared by a combination of the partial oxalate and the polymerized complex methods, Journal of Alloys and Compounds, Jan. 16, 2001, pp. 140-146, vol. 314, Elsevier, Switzerland.

Zhuang, Jia et al., Study on nanophase cobalt oxide ($Co_3O_4$) fabrication by a solid-state reaction at ambient temperatures, Journal of Inorganic Materials, pp. 1203-1206, vol. 16, No. 6, Nov. 2001. (English Abstract).

Zhang, Feng et al., Cerium oxide nanoparticles: Size-selective formation and structure analysis, American Institute of Physics, Jan. 7, 2002, pp. 127-129.vol. 80, No. 1.

Hao, Chen et al., The Technique for Preparing Nanometer $Al_2O_3$ Powder with Chemical Method, Materials for mechanical engineering, Jul. 2002, pp. 25-27, vol. 26, No. 7.

Liu, Jian-Ben et al, Preparation of Nanometer-Sized ZnO Particles by Gass-Solid Phase Reaction, Fine Chemical Intermediates, Oct. 2002, pp. 26-27, vol. 32, No. 5. (English Abstract).

Yang, Yang et al., ZnO nanoparticles prepared by thermal decomposition of beta-cyclodextrin coated zinc acetate, Chemical Physics Letters, May 13, 2003, pp. 22-27, vol. 373, No. 1-2, Elsevier, Netherlands.

Shen, Xiao-Qing et al, Preparation of nanosized alumia powders by pyrolysis of ammonium aluminum carbonate hydroxide, Chinese Journal of Inorganic Chemistry, Jun. 2003, pp. 650-654, vol. 19, No. 6. (English Abstract).

Sun, Xudong et al. Synthesis of Nanocrystalline $\alpha$-$Al_2O_3$ Powders from Nanometric Ammonium Aluminum Carbonate Hydroxide, Journal of the American Ceramic Society—Sun et al., 2003, pp. 1321-1325, vol. 86, No. 8.

Makela, J.M. et al, Generation of metal and metal oxide nanoparticles by liquid flame spray process, Journal of Materials Science, Apr. 15, 2004, pp. 2783-2788, vol. 39, No. 8.

Yuan, Fangli et al., Preparation of zinc oxide nanoparticles coated with homogeneous $Al_2O_3$ layer, Materials of Science and Engineering, Oct. 28, 2004, pp. 55-60.

Li, Jiang et al., Effects of $\alpha$-$Al_2O_3$ Seeds on the Phase Transformation and Microstructure of Alumina, Journal of Inorganic Materials, Nov. 2004, pp. 1293-1297, vol. 19, No. 6. (English Abstract).

Jha, R K et al., Synthesis of Bismuth Oxide Nanoparticles using Bismuth Nitrate and Urea, Ceramics International, 2005, pp. 495-497, vol. 31, No. 3, Elsevier Science Ltd., Oxford, UK.

Vale, Damaris et al., Production of Nanoparticles of Aluminum Oxide by Decomposition of Aerosols of Aluminum Nitrate Solution in a Flame, Transactions of the American Nuclear Society, 2005, pp. 352-353, vol. 92, American Nuclear Society, Inc., La Grange Park, IL, USA.

Patil, M M et al., Synthesis of Bismuth Oxide Nanoparticles at 100 C, Materials Letters, 2005, pp. 2523-2525, vol. 59, No. 19/20, Elsevier, BV, Amsterdam, Netherlands.

Tani, T. et al., Effects of solvent on powder characteristics of zinc oxide and magnesia prepared by flame spray pyrolysis, Nippon Seramikkusu Kyokai Gakujutsu Ronbunishi (Journal of Ceramic Society of Japan), 2005, pp. 255-258, vol. 113, No. 3, Nippon Seramikkusu Kyokai, Tokyo, Japan.

Niederberger, M. et al, Non-aqueous routes to crystalline metal oxides nanoparticles: Formation mechanisms and applications, Progress Solid State Chemistry, 2005, pp. 59-70, vol. 33, No. 2-4, Elsevier, UK.

Li, Feng et al., One-step solid-state reaction synthesis and gas sensing property of tin oxide nanoparticles, Sensors and Actuators B, Jan. 5, 2005, pp. 165-169, vol. 81, No. 2-3, Elsevier Sequoia S.A., Lausanne, CH.

Wang, Xiong et al., Optical and electrochemical properties of nanosized NiO via thermal decomposition of nickel oxalate nanofibres, Nanotechnology, Jan. 2005, pp. 37-39, vol. 16, No. 1.

Chen, Yixian et al., Preparation. and characterization of palladium colloidal nanoparticles by thermal decomposition of palladium acetate with microwave irradiation, Journal of Materials Science & Technology, Mar. 2005, pp. 187-190, vol. 21, No. 2, Editorial Board J. Mater. Sci. & Technol, China.

Dar, M A et al., Preparation and characterization of alpha-FeOOH and alpha-$Fe_2O_3$ by sol-gel method, Journal of Materials Science, Jun. 2005, pp. 3031-3034, vol. 40, No. 11, Kluwer, Norwell, MA, USA.

Nethravathi, C. et al., Ferrimagnetic nanogranular $Co_3O_4$ through solovothennal decomposition of colloidally dispersed monolayers of $\alpha$-cobalt hydroxide, Journal of Physical Chemistry B, Jun. 16, 2005, pp. 11468-11472, vol. 109, No. 23.

Morales, J. et al., Synthesis and characterization of nanometric iron and iron-titanium oxides by mechanical milling: electrochemical properties as anodic materials in lithium cells, Journal of Electrochemical Society, Sep. 2005, pp. A1748-A1754, vol. 152, No. 9, Electrochem. Soc, USA.

Carja, G. et al., From the organized nanoparticles of copper and vanadium containing LDHs to the small nanoparticles of mixed oxides: A simple route, Mater. Lett (Netherlands), Oct. 2005, pp. 3078-3080, vol. 59, No. 24-25, Elsevier, Netherlands.

You-Cheng, Wu et al., Synthesis of $Al_2O_3$ nanopowders by electrical explosion of wires, High Power Laser and Particle Beams, Nov. 2005, pp. 1753-1756, vol. 17, No. 11, IEE, Nucl. Soc., China. (English Abstract).

Muller, A. et al., Polyol method for the preparation of nanosized $Gd_2O_3$, boehmite and other oxides, Materials Research Bulletin, Dec. 8, 2005, pp. 2153-2169, vol. 40, No. 12, Elsevier, USA.

(56) References Cited

OTHER PUBLICATIONS

Polarz, Sebastian et al., Molecular encoding at the nanoscale: From complex cubes to bimetallic oxides, Angewandte Chemie—International Edition, Dec. 9, 2005, pp. 7892-7896, vol. 44, No. 48.

Zhang, Maolin et al., Novel preparation of nanosized $ZnO—SnO_2$ with high photocatalytic activity by homogeneous co-precipitation method, Materials Letters, Dec. 2005, pp. 3641-3644, vol. 59, No. 28, Elsevier, Netherlands.

Callone, E. et al., Nanopowders of metallic oxides prepared by the hydrolytic route with starch stabilization and biological abetment, Journal of Nanoscience and Nanotechnology, Jan. 2006, pp. 254-257, vol. 6, No. 1, American Scientific Publishers, USA.

Zhang, Yan Feng et al., Synthesis and characterization of $Ca_3Co_4O_9$ nanoparticles by citrate sol-gel method, Mater Lett, Sep. 2006, pp. 2443-2446, vol. 60, No. 20.

Shao, Huiping et al., Cobalt nanoparticles synthesis from $Co(CH_3COO)_2$ by thermal decomposition, Journal of Magnetism and Magnetic Materials, Sep. 2006, pp. e28-e30, vol. 304, No. 1.

Vasylkiv, Oleg et al, Nonisothermal synthesis of yttria-stabilized zirconia nanopowder through oxalate processing. I-Characteristics of Y—Zr oxalate synthesis and its decomposition, American Ceramic Society, Sep. 2000, pp. 2196-2002, vol. 83, No. 9.

Xu, J.L. et al, RF induction plasma synthesized calcium phosphate nanoparticles, Key Engineering Materials, vols. 309-311, May 2006, pp. 511-514, Trans Tech Publications, Switzerland.

Tsuzuki, Takuya et al., ZnO Nanoparticles Synthesised by Mechanochemical Process, Scripta Materialia, 2001, pp. 1731-1734, vol. 44, Nos. 8/9.

Wostek-Wojciechowska, Dorota, et al., The solid-state synthesis of metal nanoparticles from organometallic precursors, Journal of Colloid and Interface Science, Jul. 1, 2005, pp. 107-113, vol. 287, No. 1, Academic Press, New York, NY, USA.

Zhijian, Wang, et al, Low-temperature synthesis of ZnO nanoparticles by solid-stae pyrolytic reaction, Nanotechnology, Jan. 1, 2003, pp. 11-15, vol. 14, No. 1,10P, Bristol, GB.

U.S. Appl. No. 11/707,840, Nov. 27, 2009, Restriction Requirement.
U.S. Appl. No. 11/707,840, Apr. 1, 2010, Office Action.
U.S. Appl. No. 11/707,840, Oct. 14, 2010, Final Office Action.
U.S. Appl. No. 11/707,840, Jan. 27, 2011, Interview Summary.
U.S. Appl. No. 11/707,840, Jan. 27, 2011, Advisory Action.
U.S. Appl. No. 11/707,840, May 24, 2011, Office Action.
U.S. Appl. No. 11/707,840, Dec. 28, 2011, Final Office Action.
U.S. Appl. No. 11/707,840, Mar. 8, 2012, Notice of Allowance.
U.S. Appl. No. 14/201,538, filed Mar. 7, 2014, Maryam Khosravi-Mardkhe et al.
U.S. Appl. No. 13/069,317, May 15, 2014, Restriction Requirement.
U.S. Appl. No. 13/836,985, Jul. 1, 2014, Office Action.
U.S. Appl. No. 13/069,317, Jul. 31, 2014, Office Action.
U.S. Appl. No. 13/069,317, Feb. 12, 2015, Final Office Action.

Wu W et al. "Preparation of nanocrystalline zinc carbonate and zinc oxide via solid-state reaction at room temperature," Materials Letters, North Holland Publishing Company, Amsterdam, NL, vol. 60, No. 21-22, Sep. 1, 2006, pp. 2791-2794.

Supplemental European Search Report from Application No. EP 11760091 dated May 6, 2015.

* cited by examiner

IRON AND COBALT BASED FISCHER-TROPSCH PRE-CATALYSTS AND CATALYSTS

CROSS-REFERENCE TO RELATED APPLICATIONS

This application is a Utility of, and claims priority to and the benefit of, U.S. Provisional Application Ser. No. 61/615,681 filed on Mar. 26, 2012 and entitled "IRON AND COBALT BASED FISCHER-TROPSCH PRE-CATALYSTS AND CATALYSTS," which application is hereby expressly incorporated herein by this reference in its entirety.

GOVERNMENT RIGHTS

This invention was made with government support under STTR Phase II grant No. IIP-0956628 awarded by the National Science Foundation. The government has certain rights in the invention.

THE FIELD OF THE INVENTION

The Fischer-Tropsch (FT) synthesis is a well known process for synthesizing liquid hydrocarbons. This process converts synthesis gas (syngas) composed of $H_2$ and CO at modest temperatures and pressures (e.g., 200-260° C., 15-40 atm) via hydrogenation and chain propagation to form hydrocarbons such as naphtha, diesel and paraffin wax, ranging in carbon number from $C_1$ to about $C_{100}$ with an equal amount of water and a small amount (1-5%) of alcohols. Syngas is produced by "reforming" natural gas (mainly methane) or biogas (methane and carbon dioxide) obtained by anaerobic digestion of biomass or by gasifying biomass or coal. Typically, the raw syngas must be purified of contaminants which include $H_2S$, chlorine, ammonia, tars, and particulate matter.

The general chemistry of the Fischer-Tropsch reaction is as follows:

$$nCO+(2n+1)H_2 \rightarrow C_nH_{2n+2}+nH_2O \quad (1)$$

$$CO+H_2O \rightarrow CO_2+H_2 \quad (2)$$

These reactions are carried out in the presence of metallic cobalt and Fe carbide catalysts. Cobalt catalysts do not catalyze the water-gas-shift (WGS) reaction (No. 2) to produce more $H_2$; iron catalysts do.

State of the art commercial iron FT catalysts are made by various laborious multi-step precipitation methods. Iron FT catalysts are traditionally made by co-precipitation of iron and copper salts (about 5 wt % copper). Following precipitation and washing, two additional components are typically added: (1) 1-5 wt % potassium acts as a chemical promoter which shifts the yield in the FT reaction from smaller molecular weight to higher-molecular weight hydrocarbons, and (2) 10-80% silica or alumina binder or support (also referred to herein as a "textural promoter" at lower amounts) or sometimes as "supported" at higher amounts.

The precipitated catalyst containing metal salts and promoter(s) is calcined (heated in air) to about 300-500° C. to decompose the salts of Fe, Cu and K to form the metal oxides. Typical calcined catalyst characteristics include surface area, pore size, pore volume, and nanoparticle size. A precipitated iron catalyst containing about 10-30% binder, support or textural promoter is referred to as "unsupported." Catalysts containing more than 50% of a binder, support, carrier, textural promoter, carrier, etc are also referred to as "supported." The term "textural promoter" is used herein to include materials such as alumina, silica, ceria, and titania known in the catalyst art as binders, carriers, stabilizers, supports and the like.

The results of the calcination process described above are mixed-metal oxide products, henceforth referred to as "pre-catalysts," the unsupported form of which contains 10-30% alumina, silica, or manganese oxide textural promoters or the supported form of which contains 50-80% of a porous metal oxide such as alumina, silica, titania, or zirconia (usually in the form of a pellet or sphere). The Fe-based pre-catalyst must next be activated by reduction of the Fe followed by carbiding or alternatively by direct reduction and carbiding by the syngas in the Fischer-Tropsch reactor. The reduction process typically involves heating to 225-500° C. for 12-24 hours in the presence of gaseous hydrogen to partially reduce the Fe oxide to the metal. Carbiding involves heating the calcined or reduced catalyst in the presence of syngas or carbon monoxide to 225-400° C. for 12-24 hours to produce "activated catalysts" containing active iron carbide phases.

In an alternative method, fused iron catalysts can be prepared by adding textural promoters such as aluminia and/or silica to melted iron oxide at high temperature. Solid chunks are obtained from the cooled mixture, ground and sized. The specific catalytic activity of fused iron catalysts is generally lower than that of precipitated iron catalysts. The catalytic activity of fused iron has been measured in stirred-tank reactors, and found to be about half that of precipitated iron catalysts (See Fuel Processing Technology, 1992, Vol. 30, pp. 83-107).

The preparation of cobalt FT catalysts typically involves the following steps: (1) pre-calcination of a high surface area $Al_2O_3$ or silica textural promoter or La-stabilized $Al_2O_3$ at 650-800° C.; (2) multi-step impregnation with an aqueous solution of $Co(NO_3)_2$; (3) controlled drying at 100-120° C. for 12-24 hours; (4) controlled calcination in flowing air at 250-300° C. for 10-16 hours; and (5) carefully controlled reduction in hydrogen gas at 350-400° C. for 16-24 hours. Small amounts of Pt, Re, or Ru promoters are added to facilitate lower-temperature reduction, thereby preventing grain growth to larger particles. The preferred crystallite size distribution of Co metal is 6-10 nm which is in the same range as desired for iron carbide crystallites in iron FT catalysts. The alumina is typically stabilized against hydrothermal breakdown by addition of about 2-4% La or Ba oxide or 5-20% silica, titania, or zirconia. Silica stabilized with zirconia or titania can be used in place of alumina Precipitated iron catalysts and cobalt catalysts prepared by the foregoing multi-step methods by someone knowledgeable in the art, are typically active, selective, and productive for FT synthesis; however the process for preparing such catalysts is very laborious.

High-surface-area Co and Fe catalysts are used in the low-temperature FT process (230-270° C.) in the form of pellets in fixed-bed reactors (FBRs) or in the form of a fine powder (50-100 micron diameter particles) in slurry-bubble-column reactors (SBCRs) Low-surface-area fused iron catalysts find application only in the high-temperature (325-400° C.), gas-phase FT synthesis operated by Sasol in South Africa to produce mainly gasoline. Catalysts used in SBCRs must have high attrition resistance; otherwise separation of the catalyst from the liquid product is not possible. Unsupported precipitated iron typically lacks adequate mechanical strength to avoid high rates of attrition, thus producing significant quantities of 1-10 micron diameter particles. These micron range particles can (1) in large amounts increase the viscosity of the reactor fluid, preventing fluid circulation and catalyst separation, requiring shutdown of the process and (2) in small amounts escape from the reactor as a contaminant in the hydrocarbon product, especially waxy products. Iron particulate contaminants in the wax product are very difficult to remove, significantly increase the processing costs of these products, and diminish product value. Other serious problems encountered with FT catalysts include loss of activity or selectivity due to poisoning, carbon deposition, and sintering.

Thus, given the laborious nature of FT catalyst preparation and the difficulties inherent in making catalysts that have low resistance to chemical deactivation and mechanical attrition, there is a clear need for simple methods of preparation which at the same time are designed to produce iron and cobalt catalysts having high activity, selectivity, chemical stability, and mechanical stability.

Details and principles of the prior art of catalyst preparation are found in books by Stiles and Koch [1995]; Bartholomew and Farrauto [2006], and Regalbuto [2007]. Examples of various supports and procedures for making supports are disclosed in U.S. Pat. Nos. 2,749,216; 2,796,326; 2,917,366; 3,019,080; 3,038,784; 3,042,696; 3,244,972; 3,419,352; 3,823,895; 3,898,322; 3,941,719; 3,944,658; 3,987,155; 4,154,812; 4,172,809; 4,175,118; 4,275,052; 4,387,085; 4,532,072; 4,579,729; 4,676,928; 5,455,019; 5,480,630; 5,593,654; 5,622,684; 5,863,515; 6,001,326; 6,027,706; 6,129,904; 6,555,496; 6,761,866; 6,764,672; 7,090,824; 7,163,963; 7,235,224; 7,341,976; 7,442,290; 7,534,415; and 7,807,605.

SUMMARY OF THE INVENTION

This invention relates to a method for making iron and cobalt pre-catalysts and catalysts in activated, finished form suitable for use in Fischer-Tropsch synthesis. The pre-catalysts are typically nanoparticles which are readily prepared in a simple process in which an iron and/or cobalt salt and a base are conveniently mixed in one step in a solvent deficient environment. The iron and cobalt salt may be in the anhydrous or hydrated form. If only anhydrous salts are used, a small amount of water is added as a reagent to supply the OH moiety for the formation of an intermediate product (metal hydroxide/metal oxyhydroxide). Water may also be added in small amounts to facilitate mixing of the components, but not in sufficient amounts to solubilize them, typically forming a slurry, not a solution. Additional components important to final composition of the pre-catalysts, such as a copper and a potassium salt, in the case of iron pre-catalysts, and a noble metal salt, such as Pt, Re or Ru, in the case of cobalt, may also be present in the initial process. A highly porous metal oxide textural promoter, such as alumina, silica, titania, and/or ceria may be added to the initial metal salt-base reaction mixture or after the initial reaction but prior to the calcining step described below as known in the art, if the textural promoter is present in relatively low amounts, such as about 10-30% by weight, the resulting pre-catalysts are said to be "unsupported." If the textural promoter is present in about 50-90% by weight, the resulting catalysts are said to be "supported." Such highly porous textural promoters may be in the form of powder, granules or formed shapes such as pellets or spheres. Both unsupported and supported pre-catalysts are provided by this invention. After the initial reaction of the metal salts with the base, the mixture is heated in air (calcined) at a temperature that can range from about 150° C. to 750° C. which forms an iron or cobalt oxide pre-catalyst. Alternatively, the mixture is dried at 25-120° C. prior to calcination.

Pre-catalysts prepared as described above can be further processed such as by reducing the iron oxide to the metal and carbiding the metal in the case of iron pre-catalysts, or by reducing the cobalt oxide to the metal in the case of cobalt pre-catalysts to prepare catalysts in the finished form for processes such as the FT process.

DETAILED DESCRIPTION

Figure 1:
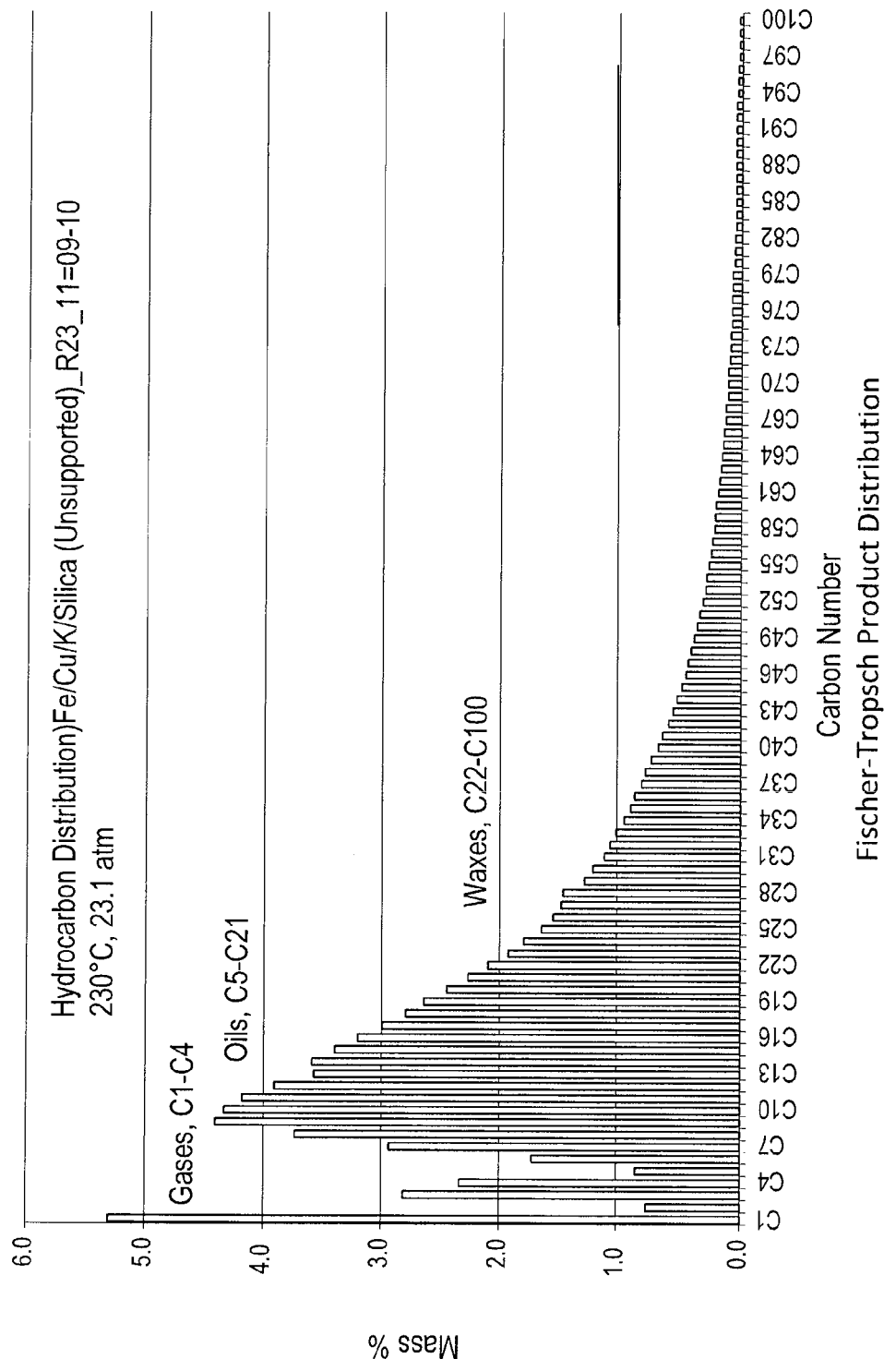
FIG. 1 shows the activity/selectivity of the catalyst prepared by the process of Example 15 in producing a hydrocarbon distribution in a Fischer Tropsch reaction carried out from 400-800 hours, also described in Example 15. The hydrocarbon product distribution was desirable with low $CH_4$ and high $C_2+$.

The following descriptions and examples illustrate the preferred embodiments of the present invention in detail. Those skilled in the art will recognize that there are numerous variations and modifications of this invention that are encompassed by its scope. Accordingly, the description of the preferred embodiments should not be deemed to limit the scope of the present invention.

As used herein the term "nanoparticle" is a broad term and is used in its ordinary sense, including, without limitation, a particle of matter reasonably measureable on the nanometer scale, including, but not limited to, a particle measuring between about 1 nm to about 100 nm in diameter. Nanoparticle may refer to a particle of matter in any particular solid or semi-solid form, including, but not limited to crystalline and amorphous solid forms. In certain embodiments, the nanoparticles may occur in sub-ranges within the foregoing range such as but not limited to about 1-50 nm, about 5-80 nm, 5-30 nm, and 10-40 nm, etc.

The iron and/or cobalt metal or metal oxide pre-catalyst nanoparticles in a sample may comprise various oxidation states or may substantially comprise the same oxidation state.

The term "textural promoter" comprises a metal oxide such as alumina, silica, titania, and ceria, singly or in combination, typically used in the art as catalyst binder, support or carrier. Catalysts with 10-30% by weight of such materials are generally known as "unsupported"; catalysts with from about 50-90% by weight are "supported". Of particular interest are aluminas because of their superior thermal, hydrothermal, and mechanical stability over a wide range of conditions, although silicas are often preferred in cobalt catalysts. Of the different alumina phases, gamma alumina is most often the preferred structure because of its high thermal stability, relatively high surface area, high mechanical strength and its ability to be formed into extrudates or pellets of high strength. Effective forms of commercial alumina supports include Saint Gobain trilobe pellets and Alfa Aesar pellets. Both anatase and rutile titania may also be used. Textural promoters may contain other components such as lanthanum to hydrothermally stabilize the alumina as known in the art. Other properties of highly porous textural promoters, such as BET surface area, pore diameter, and pore volume are consistent with properties well known in the art for supported and unsupported metal catalysts of alumina, silica, titania, zirconia and ceria.

Concentrations, amounts, temperatures and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a temperature range of about 150-750° C. should be interpreted to include not only the explicitly recited limits, but also to include individual temperatures and temperature ranges such as 200-300° C. and any temperature within said range and the like. Likewise a molar ratio of 0.01 to 10 should be interpreted to include not only the explicitly recited limits but any amount or range within said range such as 0.05, 0.05-1 and the like.

Pre-catalyst Nanoparticle Synthesis

The method for synthesis of the iron and/or cobalt pre-catalyst nanoparticle materials involves simple, flexible steps: mixing a dry, crystalline metal salt (e.g., an iron nitrate) with a dry, crystalline base (e.g., ammounium bicarbonate) in a solvent free environment and then heating (calcining) to a modest temperature (e.g., about 250-350° C.). The molar ratio of metal salt to base may range from about 0.01 to 10, although a ratio of 1.0 is typically preferred. Iron and cobalt nanoparticle precursors comprising the metal cation and the anion of the base form specific compositions. In the heating step, the metal oxides form and crystallize and all of the byproducts escape as simple, common gases that can be easily trapped. Or, alternatively, the intermediate precursor can be rinsed with water to remove the byproduct salts, and the only effluent gas upon calcination will be water vapor. A textural promoter usually in the form of a powder is typically added to the initial reaction mixture in the amount of 10-30 wt % when an unsupported pre-catalyst is prepared and usually in the form of larger particles such as granules or pellets and in the amount of about 50-90-% by weight when a supported pre-catalyst is prepared. The textural promoter may be added any time prior to calcining, although it is preferred that it be present in the initial reaction.

The iron or cobalt salt, the solid base and textural promoter are intimately mixed to facilitate the initial solid-state reaction with no added solvent. Water is added only as a reactant in the form of a hydrate salt or in small, amounts if the reactants are anhydrous, or a small amount of water may be added to facilitate mixing but not in sufficient amounts to solubilize the reactants. This condition is characterized as "no solvent added" or "solvent deficient." Small amounts of other liquids such as ethanol may be used to facilitate mixing so long as the solvent deficient condition is met. Additional materials may also be included in the mixture such as a copper salt (e.g., $Cu(NO_3)_2.2.5H_2O$) and a potassium salt (e.g., $KCO_3$) for iron based pre-catalysts. Noble metal salts such as those of Ru, Pt, Pd, or Rh (e.g., $PtCl_2$, $PtCl_4$) may be added during the preparation of cobalt based pre-catalysts. Amounts of Cu and K added to iron catalysts are typically in the range of about 2 to 8 wt % and about 0.5 to 4 wt % respectively based on the total weight of the final reduced and/or carbided catalyst. The corresponding weight percentage of noble metal added to cobalt catalysts ranges from 0.05 to 0.3 of the cobalt catalyst. Waters of hydration, if present, in the starting materials are released and the mixture is wetted and assumes a pasty or thick slurry consistency. In this solvent deficient environment, the reaction of the partly hydrated metal cation with the base forms metal hydroxides or metal oxide hydroxides and the byproduct anion of the metal salt associates with the cation of the base. The entire mixing process is typically carried out within 10-30 minutes. In most embodiments, the reaction is complete after ten to fifteen minutes and the resultant "green" precursor material is stable and may be dried (e.g., at 100° C.) and stored if desired. Extensive analytical investigations of the initial precursor reaction products indicate that they consist of complex mixtures of the hydroxides or oxide hydroxides of the iron or cobalt salt and the byproduct intermediates, which are unique to the metal salts and bases used.

The temperature of the material in the mixture is not particularly limited and may vary during the mixing. In certain preferred embodiments, the mixing is conducted at room temperature (e.g., 20° C. to 30° C.) or slightly below room temperature. However, in other embodiments, the mixing takes place at a temperature well above room temperature (e.g. 60-90° C.). The method of mixing is not particularly limited. Examples include, but are not limited to, mortar and pestle grinding, impeller mixing or counter rotator mixing. The resulting product is typically dried at a temperature of about 30-120° C., or alternatively not dried and the wet, green product is calcined directly.

A wide variety of iron salts may be used in the reaction including iron nitrate, iron oxalate, iron acetate or iron chloride in both the ferrous and ferric forms. Similarly, a wide variety of cobalt salts also may be used such as cobalt nitrate, cobalt oxalate, cobalt acetate, cobalt citrate, and cobalt chloride. The salts may be anhydrous (in which case a small amount of water is added sufficient to form the metal hydroxide intermediate and, if needed, to facilitate mixing of the reactants, but not sufficient to solubilize the salts, thus the term "no solvent added" is used herein) or a hydrated salt may be used such as $Fe(NO_3)_3.9H_2O$ or $Co(NO_3)_2.6H_2O$. Nitrate salts are generally preferred for ease of decomposing the salt anion in the heating step.

The base may comprise a compound that, when mixed with the metal salt(s), leads to the partial or complete hydrolysis of the metal salt and provides counter-cations for the anion of the metal salt. The base may be in a solid form or it may be in a liquid form. Examples of the base include, but are not limited to, ammonium carbonate, ammonium bicarbonate, ammonium sesquicarbonate, ammonium chloride, ammonium oxalate, ammonium sulfate, ammonium hydroxide, ammonium nitrate, potassium carbonate, lithium hydroxide, sodium hydroxide, potassium hydroxide, magnesium hydroxide, calcium hydroxide, and mixtures thereof. The ammonium salts are preferred for ease of decomposing the base anion in the heating step without the necessity of a washing step.

The cobalt and/or iron metal salt and the base may be provided in various amounts and molar ratios. According to certain embodiments, the molar ratio of the metal salt to base is not particularly limited. For example, the molar ratio of the metal salt to base may be about 0.01 to 10 or any number between. In addition, the molar ratio of the metal salt to base can comprise a number within the foregoing range to about any of the other foregoing numbers, including, but not limited to, 0.01-5, 1-4, 2-6 and 1-3, etc.

In a second step of the process to prepare the pre-catalyst, the precursor material prepared as described above is heated in air (calcined), and two parallel reaction occur: (1) the metal hydroxides dehydrate to form metal oxides or mixed-metal oxides which usually crystallize into nano-sized particles, and (2) the byproduct salt is decomposed into common gases. For example, organic salts such as oxalate, citrate, and acetate decompose to produce carbon dioxide and water; alkoxides release the alcohol; and nitrates produce ammonia and NOx gases. Nitrate salts are preferred for production of the majority of compositions, but for some compositions, other salts are preferred to produce different surface/pore structure properties (e.g., chlorides, sulfates or alkoxides) The temperature and dwell time in the calcining step appear to be largely limited by the need to achieve the temperatures for formation of the oxide(s) and decomposition of the byproduct salt. The required temperature is nominally 300° C., but will vary from 250° C. to as much as 400° C. or even higher in a few cases. Nevertheless, it is preferred that the heating (calcination) be conducted under optimized conditions based on results of temperature programmed oxidation experiments including various heating rates, dwell temperatures, and dwell times to prepare the desired metal oxide product. In addition, the heating may be conducted under a combination of two or more heating rates, dwell temperatures and/or dwell times. The principal requirements are that (1) the necessary temperature be reached and sustained to enable formation of the metal oxide and decomposition of any byproducts and (2) during this process the evolution rates of water and other calcination vapor byproducts are minimized to prevent sintering.

The procedure may also be modified by washing the intermediate hydroxide product of the initial reaction with a solvent prior to the second, calcination step, to remove the byproduct salt. Water adjusted to a pH at which the initial intermediate hydroxide product is insoluble is the preferred solvent, although organic solvents such as alcohols may also be used, and in some cases are clearly preferred due to their lower viscosity. The washed intermediate is then calcined as described above to dehydrate the intermediate to form the metal oxide nanoparticles, and water or the organic solvent is the only effluent gas produced in the calcination process. The present method typically produces very small, pure, highly crystalline nanoparticle metal oxide pre-catalysts with very tight size distributions.

Additional details regarding methods for making the metal oxide components of the pre-catalysts of this invention in a solvent deficient environment and the reagents that can be used are disclosed in Applicants co-pending U.S. patent application Ser. No. 11/707,840, filed Feb. 16, 2007, now U.S. Pat. No. 8,211,388 which is hereby incorporated by reference in its entirety.

When supported pre-catalysts are prepared by the method described above, the nanoparticle metal oxide generally forms on/in the porous surfaces of the support and as it is calcined, metal oxide nanoparticles are formed and dispersed on the surfaces of the support material, especially within the pores. Distribution of the metal oxide within the pores of the support can be improved by adding non-reacting species to improve penetration into and distribution within the pores. For example, organic solvents (e.g. alcohols), surfactants, water, acid, base, or combinations thereof may be added to increase strong electrostatic adsorption of the metal oxide; influence the concentration profile of the precursor in the pores; adjust the viscosity of the solution; and/or decrease the surface tension to get better penetration into the pores. Organic solvents (e.g. alcohols) may be used instead of water for washing, since the lower viscosity of the solution can prevent collapse of pores during the drying step. Addition of non reacting species or solvents during either the precursor formation or washing steps may significantly alter the pore structure of the final material. In general, the resulting metal oxide pre-catalyst materials are nanoparticles, but in some instances the calcined pre-catalyst nanoparticles may interact strongly with the support surface, wet the support surface, and/or be dispersed as a monolayer or multilayer coating or raft on the surface of support pores.

The iron and cobalt metal oxides can then be further treated to form Fischer-Tropsch catalysts. In one embodiment, supported iron pre-catalysts are reduced at a temperature, e.g., of 225° C., in hydrogen at 1-10 atm and high space velocities using a carefully designed sequence of low heating rates and temperature holds to minimize sintering of the catalyst by water vapor, and in the case of iron catalysts are then carbided by treatment with syngas ($H_2$/CO) or carbon monoxide at, e.g., 220° C.-300° C. at 1 to 20 atm for about 12-24 hours, also at a high space velocity and using a similarly carefully designed temperature program. These reduced, carbided catalysts are typically passivated and stored in wax. In another embodiment, the supported or unsupported pre-catalyst metal oxide can be reduced and carbided in a Fischer-Tropsch reactor under the aforementioned conditions to both reduce the oxide to the metal and to carbide the metal. Typically, about 60-80% of the iron is reduced and/or carbided, and therefore, catalytically active. Reduction and carbiding processes, including choices of concentration, flowrate and heating rate, are designed to obtain the most active, selective, and stable catalysts as known in the art. The cobalt oxides are reduced by heating in the presence of hydrogen at temperatures and pressures similar to those used for iron catalysts. These treatments also determine the size and size-distribution of cobalt nanoparticles (also called crystallites) or iron carbide nanoparticles (also called crystallites) in the final catalyst. The preferred cobalt metal or iron carbide crystallite size distribution for an active, selective cobalt or iron FT catalyst is about 6-12 nm with 8-10 nm being preferred. Smaller crystallites are less active and less selective for the more desired larger FT product molecules. If the particles are much larger, the active surface area will be smaller and the activity will thus be lower. Hence, controlling particle size is desirable.

Unsupported and supported catalysts may be spray-dried to form granules or extruded into pellets when used, for example, in a fixed bed reactor in the FT synthesis. If the catalyst is to be used in a slurry bubble column reactor, an additional binding agent, may be added in the spray drying process to improve the resistance of the small catalyst particles to attrition and fracture during rapid circulation in the slurry.

The properties of the unsupported and supported catalysts of this invention such as surface area, pore volume, pore diameter and hydrogen uptake or chemisorption are consistent with high quality FT catalysts. For example, surface areas of unsupported iron catalysts may be on the order of about 40 to 260 $m^2$/g, pore volumes of about 0.10 to 1.15 $cm^3$/g, and pore diameters of about 3-40 nm with chemisorption $H_2$ uptakes of 150-250 µmol/g. Supported catalysts have pore structures close to the original support (pore volume is typically decreased 30-40%) and chemisorption $H_2$ uptakes of 150-350 µmol/$g^2$. Activities, selectivities, and stabilities of these catalysts are comparable to FT catalysts prepared by more laborious methods. Thus, the invention comprises a simple, rapid method for preparing high quality catalysts effective in reactions such as the FT reaction. Given its simplicity and high rate of production, this method has the potential for substantial cost advantages compared to prior art processes. Embodiments of the invention are further illustrated by the following examples.

The embodiments described are for illustrative purposes only. Various modifications or changes in light thereof will be suggested to persons skilled I the art and are to be included within the spirit and purview of this application. The invention can take other specific forms without departing from the spirit or essential attributes thereof.

Example 1

A supported Fe Fischer-Tropsch pre-catalyst with final composition of 77.0 wt % alumina, 1.4 wt % copper, 2.3 wt % potassium and 19.3 wt %, iron was synthesized by first mixing Fe(NO$_3$)·9H$_2$O and Cu(NO$_3$)$_2$·2.5H$_2$O together with a synthesized gamma Al$_2$O$_3$ powder having a pore volume of about 1.4 cm$^3$/g., having an average pore diameter of 32 nm, and then adding NH$_4$HCO$_3$ and KHCO$_3$ to initiate the reaction with no solvent added. The reaction was carried out at room temperature and reached completion in approximately 10 min. This material was dried at room temperature overnight followed by drying at 100° C. for 12 hrs. It was then heated with a ramp rate of 0.5° C./min to 210° C. for 6 hrs to melt the ammonium nitrate and infiltrate the pores. It was then calcined at 300° C. for 6 hrs with a ramp rate of 0.5° C./min. The final pre-catalyst product was alumina supported ferrihydrite nanoparticles as determined by XRD, with a surface area of 251 m$^2$/g, a pore volume of 0.29 cm$^3$/g and a pore diameter of ~3.5 nm.

Example 2

A pre-catalyst sample was prepared according to the method of Example 1, except that 14 nm pore diameter and 0.74 cm$^3$/g pore volume Saint Gobain trilobe-alumina pellets were ground into a powder which was used for the alumina in the reaction. The final product was alumina supported ferrihydrite nanoparticles, with a surface area of 146 m$^2$/g, a pore volume of 0.17 cm$^3$/g and a pore diameter of ~5.3 nm.

Example 3

A pre-catalyst sample was prepared according to the method of Example 1, except that a small amount of ethanol, but still solvent deficient, was added during mixing (V$_{ethanol}$ (cm$^3$)=m$_{alumina}$ (g)×pore volume of alumina (cm$^3$/g)). The final product was alumina supported ferrihydrite nanoparticles, with a surface area of 185 m$^2$/g, a pore volume of 0.29 cm$^3$/g and a pore diameter of ~4.0 nm.

Example 4

A pre-catalyst sample was prepared according to the method of Example 1, except that a mixture of water and ethanol, but still solvent deficient, was added during mixing (V$_{water}$:V$_{ethanol}$=1:1, volume of total solvent=m$_{alumina}$(g)× pore volume of alumina (cm$^3$/g)). The final product was alumina supported ferrihydrite nanoparticles, with a surface area of 217 m$^2$/g, a pore volume of 0.21 cm$^3$/g and a pore diameter of ~3.8 nm.

Example 5

A pre-catalyst sample was prepared according to the method of Example 1, except that a small amount of water was added during mixing (V$_{water}$=m$_{alumina}$ (g)×pore volume of alumina (cm$^3$/g)). The final product was alumina supported ferrihydrite nanoparticles, with a surface area of 264 m$^2$/g, a pore volume of 0.20 cm$^3$/g and a pore diameter of 3.5 nm. The sample was then reduced at 500° C. for 16 hours in H$_2$ using a temperature program based on a thermogravametric analysis (TGA) of a temperature-programmed reduction (TPR) of an aliquot of the sample. The reduced catalyst sample had a surface area of 141.5 m$^2$/g, pore volume of 0.24 cm$^3$/g and pore diameter of ~5.4 nm. The H$_2$ uptake determined by hydrogen chemisorption on a Quantachrome analyzer was 182.2 µmol/g$^2$ and the dispersion was calculated to be 13.1%.

Example 6

A pre-catalyst sample was prepared according to the method of Example 1, except that a mixture of water and isopropanol was added during mixing (V$_{water}$:V$_{isopropanol}$=1:1, volume of total solvent=m$_{alumina}$ (g)×pore volume of alumina (cm$^3$/g)). The final product was alumina supported ferrihydrite nanoparticles, with a surface area of 211 m$^2$/g, a pore volume of 0.34 cm$^3$/g and a pore diameter of ~3.4 nm.

Example 7

A pre-catalyst sample was prepared according to the method of Example 2, except that ethanol ((V$_{ethanol}$=m$_{alumina}$ (g)×pore volume of alumina (cm$^3$/g)) was added during mixing. The final product was alumina supported ferrihydrite nanoparticles, with a surface area of 141 m$^2$/g, a pore volume of 0.42 cm$^3$/g and a pore diameter of ~14.6 nm.

Example 8

A catalyst sample was prepared according to the method of Example 2, except that a mixture of water and ethanol was added during mixing (V$_{water}$:V$_{ethanol}$=1:1, volume of total solvent=m$_{alumina}$(g)×pore volume of alumina (cm$^3$/g)). The final product was alumina supported ferrihydrite nanoparticles, with a surface area of 141 m$^2$/g, a pore volume of 0.44 cm$^3$/g and a pore diameter of ~12.2 nm. The sample was then reduced at 500° C. for 16 hours in H$_2$ using a temperature program based on a TGA analysis of a TPR of an aliquot of the sample. The reduced sample had a surface area of 118.1 m$^2$/g, a pore volume of 0.48 cm$^3$/g and a pore diameter of ~14.7 nm. The H$_2$ uptake determined by hydrogen chemisorption was 217.7 µmol/g$^2$ and the dispersion was calculated at 13.3%.

Example 9

A trilobe-shaped alumina pellet supported Fischer-Tropsch pre-catalyst with final composition of 90.4 wt % alumina, 0.7 wt % copper, 2.0 wt % potassium and 6.8 wt % iron was synthesized by mixing Fe(NO$_3$)$_3$·9H$_2$O, Cu(NO$_3$)$_2$·2.5H$_2$O, trilobe-shaped Al$_2$O$_3$ pellets (Saint Gobain), KHCO$_3$ and NH$_4$HCO$_3$ at room temperature without adding any solvent. The reaction was complete after approximately 10 min and the resulting material thus produced was dried at room temperature overnight followed by drying at 100° C. for 12 hrs. The precursor was heated to 210° C. for 6 hrs and then calcined at 300° C. for 6 hrs with a temperature ramp rate of 0.5° C./min. The final product was trilobe-shaped alumina pellets coated with ferrihydrite nanoparticles, with a surface area of 156 m$^2$/g, a pore volume of 0.58 cm$^3$/g and a pore diameter of ~13.8 nm.

Example 10

A pre-catalyst sample was prepared according to the method of Example 9, except that 0.8 wt % potassium was used. The final product was trilobe-shaped alumina pellet supported ferrihydrite nanoparticles, with a surface area of 163 m$^2$/g, a pore volume of 0.62 cm$^3$/g and a pore diameter of 14.3 nm.

Example 11

A trilobe-shaped alumina pellet supported Fischer-Tropsch catalyst with final composition of 82.57 wt % alumina, 1.45 wt % copper, 1.15 wt % potassium and 14.84 wt % iron was synthesized according to the method of Example 9, except that the reaction temperature was kept at 91° C. The product was trilobe-shaped alumina pellet supported ferrihydrite nanoparticles, with a surface area of 158.6 m$^2$/g, a pore volume of 0.48 cm$^3$/g and a pore diameter of 15.3 nm. The sample was then reduced at 500° C. for 16 hours in H$_2$ using a temperature program based on a TGA analysis of a TPR of an aliquot of the sample. The reduced sample had a surface area of 121.7 m$^2$/g, a pore volume of 0.52 cm$^3$/g and a pore diameter of ~14.7 nm. The H$_2$ uptake determined by hydrogen chemisorption was 217.5 μmol/g$^2$ and the dispersion was calculated at 20.7%. Catalytic activity was evaluated in a fixed-bed reactor at 250° C. at a pressure of 21 atmospheres, with a feed H$_2$/CO vol/vol ratio of 1.0. The rate of reaction was 19.55 mmol/g$_{cat}$·h (total pressure was 312 Psi). Selectivity based on the fraction of moles of CO converted to CH$_4$ was 0.108, to C$_{2+}$ was 0.520, and to CO$_2$ was 0.328.

Example 12

An unsupported iron Fischer-Tropsch pre-catalyst with a silica binder having a final composition of 77.0 wt % iron, 4.3 wt % copper, 3.3 wt % potassium and a 15.4 wt % silica was synthesized by first mixing Fe(NO$_3$)$_3$·9H$_2$O, Cu(NO$_3$)$_2$·2.5H$_2$O with CAB-O-Sil silica powder and then adding NH$_4$HCO$_3$ and KHCO$_3$ to initiate the reaction. The reaction was complete in approximately 10 min. The material was dried at room temperature overnight followed by drying at 100° C. for 12 hrs and heated to 210° C. for 6 hrs and calcined at 300° C. for 6 hrs with a ramp rate of 0.5° C./min. The final product was silica texturized ferrihydrate nanoparticles, with a surface area of 128 m$^2$/g, a pore volume of 1.11 cm$^3$/g and a pore diameter of ~3.6 nm.

Example 13

An unsupported iron Fischer-Tropsch catalyst with a mixture of alumina and silica textural promoter having a final composition of 79.0 wt % iron, 4.4 wt % copper, 3.9 wt % potassium, 6.5 wt % alumina, and 6.2 wt % silica was synthesized by mixing Fe(NO$_3$)$_3$·9H$_2$O, Cu(NO$_3$)$_2$·2.5H$_2$O, CAB-O-Sil silica and ~31 nm pore diameter synthesized gamma alumina with a pore volume of 1.4 cm$^3$/g, NH$_4$HCO$_3$ and KHCO$_3$. The catalyst precursor was dried at 100° C. for 12 hrs, then heated to 210° C. for 6 hrs and then calcined at 300° C. for 6 hrs with a ramp rate of 0.5° C./min. The final product was alumina and silica texturized ferrihydrate nanoparticles, with a surface area of 160 m$^2$/g, a pore volume of 0.11 cm$^3$/g and a pore diameter of ~3.3 nm. The sample was reduced at 300° C. for 16 hours in H$_2$ using a temperature program based a TGA analysis of a TPR of an aliquot of the sample. The reduced sample had a surface area of 48.7 m$^2$/g, a pore volume of 0.13 cm$^3$/g and a pore diameter of ~14.7 nm.

Example 14

A catalyst sample was prepared according to the method of Example 12, except that the mixture of CAB-O-Sil and the ground trilobe Al$_2$O$_3$ powder (St. Gobain) with a pore diameter of ~14 nm was used. The final product was alumina and silica texturized ferrihydrite nanoparticles, with a surface area of 98.6 m$^2$/g, a pore volume of 0.11 cm$^3$/g and a pore diameter of 3.7 nm.

Example 15

Figure 2:
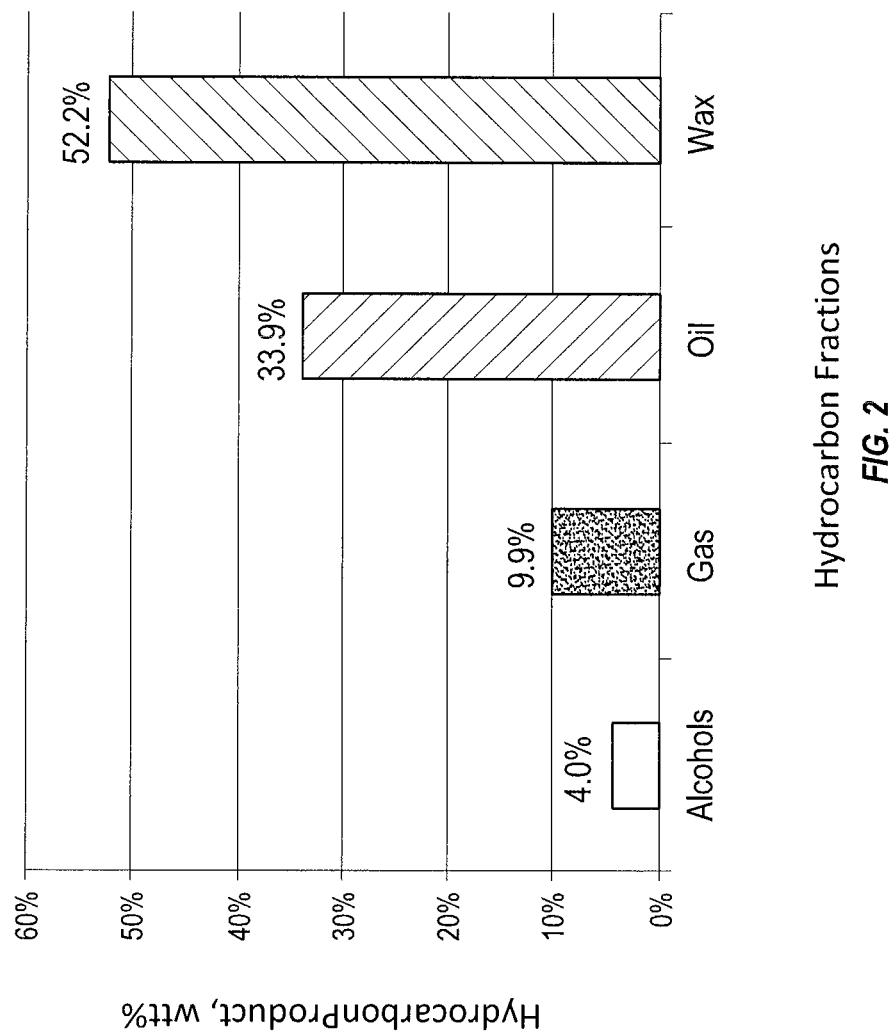
FIG. 2 shows the hydrocarbon fractions of alcohols, gases, oils and waxes of the reaction products in the Fischer Tropsch reaction of Example 15.

An unsupported iron Fischer-Tropsch catalyst with a silica textural promoter having a targeted final composition of 75 wt % iron, 5 wt % copper, 4 wt % potassium and a 16 wt % silica was synthesized by first mixing Fe(NO$_3$)$_3$·9H$_2$O, Cu(NO$_3$)$_2$·2.5H$_2$O with CAB-O-Sil silica powder and then adding NH$_4$HCO$_3$ and KHCO$_3$ to initiate the reaction. The catalyst precursor was dried at 60° C. for 12 hrs and then at 120° C. for 12 hrs. It was heated to 210° C. for 6 hrs and then calcined at 300° C. for 6 hrs. The final product was silica texturized ferrihydrite nanoparticles, with surface area of 113 m$^2$/g, pore volume of 0.14 cm$^3$/g and pore diameter of ~3.9 nm. The sample was reduced at 300° C. for 16 hours in H$_2$ using a temperature program based on a TGA analysis of a TPR of an aliquot of the sample. The reduced sample had a surface area of 66 m$^2$/g, a pore volume of 0.167 cm$^3$/g and a pore diameter of ~8.8 nm. The sample was passivated with air and sent to an independent testing laboratory, Emerging Fuels Technologies, Tulsa, Okla., for activity and product selectivity testing. Activity/selectivity data were collected from 400-800 hours on stream. For example, at 260° C., 23 bar, the extrapolated activity rate for the sample was 65 mmol/g$_{cat}$·h. The hydrocarbon product distribution was highly desirable with low CH$_4$ and high C$_{2+}$ selectivity as shown in FIGS. 1 and 2.

Example 16

An unsupported iron Fischer-Tropsch catalyst with alumina textural promoter having a final composition of 84.11 wt % iron, 4.37 wt % copper, 3.18 wt % potassium, 8.34 wt % alumina was synthesized by mixing Fe(NO$_3$)$_3$·9H$_2$O, Cu(NO$_3$)$_2$·2.5H$_2$O, synthesized gamma Al$_2$O$_3$ powder having an average pore volume of 1.4 cm$^3$/g, average pore diameter of 32 nm, NH$_4$HCO$_3$ and KHCO$_3$. The catalyst precursor was dried at 100° C. for 12 hrs, then heated to 210° C. for 6 hrs and then calcined at 300° C. for 6 hrs with a ramp rate of 0.5° C./min. The final pre-catalyst product was alumina texturized ferrihydrate nanoparticles, with a surface area of 147.4 m$^2$/g, a pore volume of 0.10 cm$^3$/g and a pore diameter of 3.3 nm. The sample was reduced at 300° C. for 16 hours in H$_2$ using a temperature program based on a TGA analysis of a TPR of an aliquot of the sample. The reduced sample had a surface area of 22.9 m$^2$/g, a pore volume of 0.11 cm$^3$/g and a pore diameter of 19.2 nm. Catalytic activity was evaluated in a fixed-bed reactor at 250° C. with a pressure of 21 atmospheres, with a feed H$_2$/CO vol/vol ratio of 1.0. The rate of reaction was 18.1 mmol/(g$_{cat}$·h) (total pressure was 312 Psi). Selectivity based on the fraction of moles of CO converted to CH$_4$ was 0.051, to C$_{2+}$ was 0.579, and to CO$_2$ was 0.317.

Example 17

An unsupported iron Fischer-Tropsch catalyst with a silica textural promoter having a final target composition of 100 wt % iron, 5 wt % copper, 4 wt % potassium and 16 wt % silica (weight ratio between iron, copper, potassium and silica) was synthesized by mixing Fe(NO$_3$)$_3$·9H$_2$O, Cu(NO$_3$)$_2$·2.5H$_2$O, and Cab-O-Sil silica powder with a mixture of KHCO$_3$ and NH$_4$HCO$_3$ to initiate the reaction which was complete in approximately 20 min. The catalyst precursor was dried at 100° C. overnight and calcined at 300° C. for 6 hrs. The sample was then reduced at 300° C. at a SV>2,000 h$^{-1}$ (volume/volume) in 10% H$_2$/He for 10 hr followed by 100% H$_2$ for 6 hr. The reduced catalyst was carefully passivated with air at ambient temperature so the bed temperature rise was less than 10° C. The reduced and passivated product had a surface area of 45.6 m$^2$/g, a pore volume of 0.14 cm$^3$/g and an average pore diameter of 10.3 nm. The H$_2$ uptake was 159 μmol$_{H2}$/g, the extent of reduction was 21.5% and the dispersion was 12.5%, giving a calculated crystallite diameter of 9.8 nm. Catalyst activity was evaluated in a fixed-bed reactor at 260°

C. and pressure of 21 atmospheres, with a feed $H_2/CO$ ratio of 1.0. Activity was 166 mmol$_{CO}$/g$_{Fe}$/WMPa$_{H2}$, and productivity was 0.71 g$_{HC}$/g$_{Fe}$/h after 374 hours on stream. Selectivity based on the fraction of moles of CO converted to $CH_4$ was 0.032, to $C_{2+}$ was 0.578, and to $CO_2$ was 0.339.

Example 18

An unsupported iron Fischer-Tropsch catalyst with a silica texturized promoter having a final target composition of 100 wt % iron, 5 wt % copper, 4 wt % potassium and 16 wt % silica (weight ratio of iron, copper, potassium, and silica) was synthesized by mixing Fe(NO$_3$)$_3$.9H$_2$O, Cu(NO$_3$)$_2$.2.5H$_2$O with NH$_4$HCO$_3$ to initiate the reaction which was complete in approximately 20 min Cab-O-Sil Silica powder and KHCO$_3$ were then added before the precursor was dried. The catalyst precursor was dried at 100° C. overnight and calcined at 300° C. for 6 hrs. The sample was then reduced at 300° C. at a SV>2,000 h$^{-1}$ (volume/volume) in 10% H$_2$/He for 10 hr followed by 100% H$_2$ for 6 hr. The reduced catalyst was carefully passivated with air at ambient temperature so the bed temperature rise was less than 10° C. The reduced and passivated sample had a surface area of 36.8 m$^2$/g, a pore volume of 0.14 cm$^3$/g and an average pore diameter of 8.7 nm. The H$_2$ uptake was 158 μmol$_{H2}$/g, the extent of reduction was 9.3% and the dispersion was 2.6%. Catalyst activity was evaluated in a fixed-bed reactor at 260° C. and pressure of 21 atmospheres, with a feed H$_2$/CO vol/vol ratio of 1.0. Activity was 154 mmol$_{CO}$/g$_{Fe}$/h/MPa$_{H2}$, and productivity was 0.72 g$_{Fe}$/g$_{Fe}$/h after 83 hours on stream. Selectivity based on the fraction of moles of CO converted to $CH_4$ was 0.032, to $C_{2+}$ was 0.553, and to $CO_2$ was 0.339.

Example 19

An alumina supported cobalt Fischer-Tropsch pre-catalyst was synthesized from Lanthanum-doped Alfa Aesar alumina pellets crushed and sieved between 250 and 600 micrometers. The resulting powder was mixed with Co(NO$_3$)$_2$.6H$_2$O and NH$_4$HCO$_3$ at room temperature with the addition of a small amount of a water/alcohol mixture consisting of 50% vol water and 50% vol isopropyl alcohol to incipient wetness (~0.9 mL/g). The reaction was complete after approximately 30 minutes and the resulting mixture was placed in a circulating oven at 60° C. for 16 hours. This resulting material was calcined using the following profile: 1° C./min from room temperature to 160° C., 0.5° C./min from 160° C. to 250° C. and holding at 250° C. for 3 hours. The pre-catalyst product was an alumina supported cobalt oxide catalyst with surface area of 134 m$^2$/g, pore volume of 0.453 cm$^3$/g, and mesopore pore diameter of 13.5 nm. The final composition was 5.9% cobalt and 94% alumina.

The invention claimed is:

1. A process for preparing an iron or cobalt based pre-catalyst consisting essentially of
   (a) reacting a metal salt selected from the group consisting of a solid iron salt and a solid cobalt salt with a solid base in the presence of a solid textural promoter, with no solvent added to produce a cobalt or iron oxide nanoparticle catalyst precursor in the pores of said textural promoter; and
   (b) calcining the product of step (a) to produce an iron or cobalt based pre-catalyst.

2. The process of claim 1 wherein the metal salt is an iron salt.

3. The process of claim 2 wherein a copper salt, a potassium salt and the textural promoter are provided in step (a) and mixed together in one step prior to heating, and wherein the calcining step is carried out at a temperature of about 150-750° C.

4. The process of claim 2 wherein the iron salt is selected from the group consisting of iron nitrate, iron oxalate, iron acetate, iron chloride and mixtures thereof and the calcining step is carried out at a temperature of 150-750° C.

5. The process of claim 2 wherein the base is selected from the group consisting of ammonium carbonate, ammonium bicarbonate, ammonium sesquicarbonate, ammonium chloride, ammonium oxalate, ammonium sulfate, ammonium hydroxide, ammonium nitrate, potassium carbonate, lithium hydroxide, sodium hydroxide, potassium hydroxide, magnesium hydroxide, calcium hydroxide, and mixtures thereof.

6. The process of claim 5 wherein the base is ammonium bicarbonate or ammonium carbonate.

7. The process of claim 2 wherein the iron salt is iron nitrate and the base is selected from the group consisting of ammonium carbonate, ammonium bicarbonate and mixtures thereof.

8. The process of claim 2 wherein the textural promoter is a metal oxide selected from the group consisting of alumina, silica, ceria, titania and mixtures thereof.

9. The process of preparing a catalyst wherein the pre-catalyst of claim 1 is prepared from an iron salt and the pre-catalyst is heated in the presence of hydrogen to reduce the resulting product which reduced product is then heated in the presence of carbon monoxide to produce iron carbide.

10. The process of claim 9 wherein the textural promoter is present in the amount of about 10-30% or 50-90% by weight based on the weight of the catalyst produced.

11. The process of claim 1 wherein the metal salt is a cobalt salt.

12. The process of claim 11 wherein a noble metal salt selected from the group consisting of Ru, Pt, Pd, Re and mixtures thereof is provided in step (a).

13. The process of claim 12 wherein the cobalt salt, the base, the noble metal salt and textural promoter are mixed together in one step prior to the heating step, and the calcining step is carried out at a temperature of about 150-750° C.

14. The process of claim 11 wherein the cobalt salt is selected from the group consisting of cobalt nitrate, cobalt oxalate, cobalt acetate, cobalt citrate, cobalt chloride and mixtures thereof.

15. The process of claim 11 wherein the base is selected from the group consisting of ammonium carbonate, ammonium bicarbonate, ammonium sesquicarbonate, ammonium chloride, ammonium oxalate, ammonium sulfate, ammonium hydroxide, ammonium nitrate, potassium carbonate, lithium hydroxide, sodium hydroxide, potassium hydroxide, magnesium hydroxide, calcium hydroxide, and mixtures thereof.

16. The process of claim 15 wherein the cobalt salt is cobalt nitrate and the base is ammonium bicarbonate, ammonium carbonate or mixtures thereof.

17. The process of claim 11 wherein the textural promoter is a metal oxide selected from the group consisting of alumina, silica, titania, ceria, and mixtures thereof.

18. A process for preparing a catalyst wherein the pre-catalyst prepared by the process of claim 11 is prepared from a cobalt salt and the pre-catalyst is heated in the presence of hydrogen to reduce the cobalt oxide.

19. The process of claim 18 wherein the textural promoter is present in the amount of about 10-30% or 50-90% by weight of the catalyst produced.

20. The process of claim 1 wherein water present in the reaction of step (a) with no solvent added facilitates the reaction.

21. A process for preparing an iron or cobalt based pre-catalyst consisting essentially of:
(a) reacting a solid metal salt selected from the group consisting of an iron salt or a cobalt salt with a solid base, with no solvent added to produce a nanoparticle iron or cobalt oxide catalyst precursor;
(b) adding a solid textural promoter to the product of step (a) to produce a pre-catalyst, and
(c) calcining the product of step (b).

* * * * *